United States Patent Office 3,826,828
Patented July 30, 1974

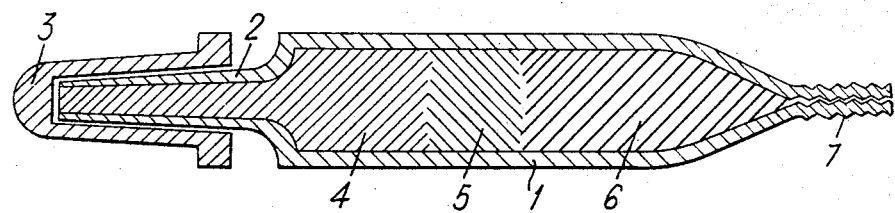

3,826,828
CONTRACEPTIVE AND DEVICE FOR
ITS APPLICATION
Paul Henri Morel, 28 Rue de l'University,
Paris 7e, France
Filed July 7, 1971, Ser No. 160,283
Claims priority, application France, July 9, 1970,
7025522
Int. Cl. A61k 27/00
U.S. Cl. 424—184                                     3 Claims

ABSTRACT OF THE DISCLOSURE

An intra-uretral contraceptive combination for use by males comprises a water-repellent liquid, e.g. a silicone liquid, and a paste, which may also be based on a silicone. In use the combination is injected into the ureter, e.g. from a suitable injector or device, so that the paste is downstream of the liquid.

---

The present invention relates to a contraceptive combination and a device for its application, and more especially, to a biologically inert and non-sterilising combination usable by males.

Contraceptive combinations which are biologically active on spermatogenesis or ovulation (for example based on steroids) show not insignificant side-effects. Deep blocking devices having a permanent sterilising effect, for example those described in U.S. Pat. No. 3,042,030 and in French Pat. No. 1,494,778, are biologically inert and hence do not suffer from these disadvantages. However, their positioning and their removal require medical or surgical work. Finally, uretral blocking devices such as those described in U.S. Pat. No. 3,373,746, may cause discomfort to their user because of their definite shape.

The combination of the present invention can be put in position at the time required by the user himself and its action is not permanent. It does not cause any discomfort or physiological or psychological reaction.

The new contraceptive combination comprises an intra-uretral contraceptive combination comprising 25 to 80% by weight of a water-repellent liquid of viscosity 5 to 5,000 cst. at 37° C., and 75 to 20% by weight of a paste of consistency 200 to 300 (at 25° C. according to A.S.T.M. standard specification D217–48), the said percentages being based on the combined weight of the liquid and paste. Both the water-repellent liquid and the paste are, of course, sterile and inert towards mucous membranes.

To the combination may be added any appropriate supplementary ingredients, such as antiseptics, dyestuffs or perfumes. If the liquid and the paste are miscible with one another it is advantageous to separate them from one another by an immiscible liquid separator.

The combination is used by injection into the ureter before sexual intercourse, the liquid compound being deposited upstream and the paste downstream. The depth of injection is at least 15 mm. and the total volume injected is generally from 1 to 5 cm.³.

The water-repellent liquid preferably has a viscosity at 37° C. of 100 to 1000 cst., and more especially 400 to 600 cst. A hydrocarbon oil, and ester (especially a glyceride), or a silicone liquid can be used, and the last is preferred, because of its stability, its chemical inertness and its good toleration by animal tissues.

The paste can be Newtonian on non-Newtonian, and is preferably thixotropic. Its consistency at 25° C. is preferably 225 to 250 measured in accordance with standard specification A.S.T.M. D217–48. The paste may be based on water, a hydrocarbon, an ester (especially a glyceride) or a silicone. Its viscosity can be a property inherent in a single substance or can result from dissolving a high molecular weight substance in a liquid, from the emulsification (without a wetting agent) of a liquid in a second immiscible liquid, or from mixing a pulverulent filler of high surface area with a suitable liquid. A preferred paste which gives satisfactory results can be obtained from a silicone oil having a viscosity between 10,000 and 500,000 cst., preferably containing a thickener, such as alumina or pyrogenic silica.

Thus, both the water-repellent liquid and the paste can be based on a dimethylpolysiloxane liquid.

One or other of these ingredients can contain any desirable adjuvant. For example, an antiseptic or a spermicide, in the form of an emulsion or a dispersion, can be incorporated into the paste. An adjuvant can also be incorporated into the separator liquid, where such a liquid is present.

In order conveniently to provide suitable positioning of the combination, it is practical to place a unit dose in an injection device. The invention therefore provides an intra-uretral injector comprising 1 to 5 cm.³ of a contraceptive combination of the invention as aforesaid, the pasty constituent being so arranged as to be injected downstream of the liquid constituent. Such an injector may comprise a collapsible tube having one end terminating in a canula and the other end sealed. The liquid constituent of the combination is placed in the tube at the canula end and the pasty constituent at the other end, the two being separated if necessary or desired by a liquid immiscible with both.

Suitable injectors may be for example, flexible metal or plastic tubes, and rigid tubes provided with pistons. Such injectors may carry a fixed or removable canula of suitable dimensions.

The mode of action of the combination is not based on any known contraceptive method. It is believed that the paste, plays a triple role: first it avoids premature loss of the liquid oil; secondly, it absorbs the greater part of the energy of the seminal liquid; and finally, if the paste is water-repellent and possibly antiseptic, the part of the paste which is not expelled reduces the dangers of infection by the partner.

The following Example illustrates the invention.

EXAMPLE

The package is a high density polyethylene tube of internal diameter 8 mm., length 30 mm. and thickness 0.2 mm., having a capacity, after sealing the base of 1.5 cm.³. It carries a 15 mm. long canula of internal diameter 3 mm. at the base and 1.5 mm. at the point, closed by a fitting cap of the same material. 0.75 cm.³ of dimethylpolysiloxane oil of viscosity 500 cst. and of medical grade is introduced through the base, followed by 0.5 cm.³ of paraffin oil (French Pharmaceutical Codex) and then by 0.25 cm.³ of a paste containing a dimethylpolysiloxane fluid of viscosity 10,000 cst., medical grade, and 10% of pyrogenic silica, surface area 300 m.²/g., the whole having a "worked" viscosity (consistency) of 260 according to the abovementioned ASTM specification. The bottom of the tube is then squashed flat and sealed in known manner.

The finished injector ready for use is shown in the accompanying drawing. The polyethylene tube 1 is provided with a canula 2 having its end closed by a cap 3. The tube and canula are filled with first the dimethylpolysiloxane oil 4, then the paraffin oil 5, and finally the paste 6. The end of the tube is closed at 7. In use, the cap 3 is removed and the contents of the injector injected by squeezing the tube 1.

I claim:
1. On intra-uretral contraceptive combination comprising 25 to 80% by weight of a sterile water-repellent di- methylpolysiloxane liquid of viscosity 5 to 5000 cst. at 37° C. and 75 to 20% by weight of a sterile paste containing a dimethylpolysiloxane oil having a viscosity between 10,000 and 500,000 cst. and, as the thickener, pyrogenic silica, the said paste having a consistency 200 to 300 at 25° C. according to ASTM standard specification D217–48, the said percentages being based on the combined weight of the liquid and paste.

2. A combination according to claim 1 in which the said liquid and paste are separated by sterile paraffin oil immiscible with either.

3. A combination according to claim 1 in which the said liquid has a viscosity of 100 to 1000 cst. and the paste has a consistency of 225 to 250.

References Cited
UNITED STATES PATENTS

| | | | |
|---|---|---|---|
| 2,727,846 | 12/1955 | Talbot | 424—184 |
| 3,239,414 | 3/1966 | Rowan et al. | 424—184 |
| 3,373,746 | 3/1968 | White | 128—138 X |
| 3,378,440 | 4/1968 | Rowan et al. | 424—184 |
| 3,697,653 | 10/1972 | Ongley | 424—184 |

ALBERT T. MEYERS, Primary Examiner

N. A. DREZIN, Assistant Examiner

U.S. Cl. X.R.

128—138; 424—78, Digest 14